Patented Feb. 26, 1935

1,992,921

UNITED STATES PATENT OFFICE 1,992,921

PRODUCTION OF BUTYL ALCOHOL AND ACETONE BY FERMENTATION

James F. Loughlin, Milwaukee, Wis.

No Drawing. Application August 6, 1931,
Serial No. 555,531

27 Claims. (Cl. 260—135)

The invention relates to processes of fermentation and especially to methods of producing normal butyl alcohol and acetone by fermentation.

It is among the objects of the invention to provide methods of producing butyl alcohol and acetone by the fermentation of sugar.

Another object of the invention is to provide methods of producing normal butyl alcohol and acetone by fermentation of sugary materials, such as beet molasses, cane molasses, sugar syrups and syrup materials derived from carbohydrates, which syrups contain saccharified substances and to efficiently utilize the same to produce the solvents normal butyl alcohol and acetone.

In accordance with the invention, the manufacture of normal butyl alcohol and acetone comprises inoculating a suitably adjusted mash containing fermentable carbohydrate material with an inoculant, which inoculant is prepared from a culture of an organism which will hereinafter be described, providing nitrogenous nutrient for the bacteria, fermenting the mash and separating the solvent from the non-solvent material.

The organism is one of the anaerobic bacteria which can be found in soils and therefore in materials which are grown in or near the soil, such as potatoes.

The following is typical of methods which may be used in preparing and isolating the organism but other methods or modifications of this method may be used.

Small pieces of potato, about 250 cc. of freshly boiled water, and a little diastatic malt extract are placed in a sterile-cotton-plugged flask and heated to about 60–65° C. for about 30 to 60 minutes. The temperature of the contents is then raised and held at 80–85° for about 10 minutes. The medium is then cooled and incubated at about 36° C. preferably under reduced oxygen tension. Within about 24 hours, a vigorous fermentation will have started. Then a transfer is made to a sterile fermentable cane molasses medium. This is incubated at 36° C. for several days, say 4 to 5 days, and heated about 10 minutes at about 80° C. and immediately cooled. Transfer is then made to a sterile fermentable sugar medium and incubated at 36° C. preferably under reduced oxygen tension. This method of heat-shocking and subculturing is carried on a number of times, say 5 to 10 times. In this manner, the organism described herein may be obtained in predominating culture.

The bacillus can then be obtained in pure culture by well known bacteriological methods of culturing anaerobes, such as (a) successive sub-cultures in deep sterile 5% potato-dextrose agar tubes. The inoculant for such sub-cultures was taken from near the bottom of said tubes after carefully cutting into same under sterile conditions. (b) Plating on 5% potato-dextrose agar, anaerobically. (c) Single cell isolation using a micro-manipulator. A large number of single cell transfers was made. Of various media used for culturing, the following is suitable. Fifteen grams of white potato were grated, boiled in a flask with 1000 cc. of distilled water for about 1 to 1½ hours and cooled to about 60° C. Five grams of pulverized barley malt in a small amount of water were added and the contents of the flask were held at 55°–65° C. for about two hours. Seven grams of beet molasses were then added. This gave a mixture containing about 1% sugar with a hydrogen ion concentration of about pH = 6 to 6.7. About 10 cc. of this mixture and a small amount of dried beef heart were added to each culture tube and sterilized by heating for about 20 minutes at 20 pounds steam pressure. The pure cultures which showed good growth and fermentation and which produced butyl alcohol and acetone were checked by well known bacteriological methods, such as the fermentability of a great number of carbohydrate materials.

The results of these checks showed that a pure culture had been obtained and that the pure culture would produce large yields of butyl alcohol and acetone by fermentation of sterile molasses mash.

The new bacterium has been named by me "Clostridium Saccharobutyl-acetonicum."

In order to facilitate the identification of the bacterium, it will be described with the aid of the Descriptive Chart of the Society of American Bacteriologists.

Name——"Clostridium Saccharobutyl-acetonicum"

Source——potato.

I. Morphology

1. Vegetative cells, Motile.
   Medium used—potato and dextrose.
   pH of medium=7.0 at time of inoculation.
   Age=18 hours.
   Temperature=36° C.
   Form—Long and short rods; chain formation.

1. Vegetative cells, Motile.—Continued.
    Size—2–12 microns long } unstained
    .7–1.2 microns wide
    Ends—rounded.
    Stain—deep blue with methylene blue
        Gram=positive-then-negative.
        Iodine=granulose positive in old cells.

2. Sporangia.
    Medium used—potato and dextrose.
    pH=7.0 at time of inoculation.
    Age=48 hours.
    Form=oval.
    Spores=sub-terminal.
    Limits of sizes=1.8–2.3 microns long x 1.4–1.9 microns wide, unstained,
    Stain=will not stain readily with methylene blue.
        Methylene blue apparently enlarges the spores.
        Gentian violet—spores stained deep blue.

II. Cultural features

1. Nutrient Agar Stab.
    Age=5 days.
    Temperature=36° C.
    Growth=none aerobically.
    Growth=anaerobically—slight, best at bottom.
    Color=cream.
    Odor=none observed.

2. Potato Slant.
    Age=24 hours.
    Temperature=36° C.
    Growth=none aerobically.
    Growth=moderate, anaerobically in 4 days.
    Form=echinulate.
    Elevation=raised.
    Luster=glistening.
    Optical character=opaque.
    Color=cream.
    Odor=butylic.
    Surface=smooth.
    Consistency=slimy.

III. Physiology

1. Optimum temperature=30°–40° C.
2. Optimum pH of cane molasses medium= approx. 4.0–6.0.
3. Gelatine stab=no liquefaction in 40 days.
4. Indole test=negative in 5 days.
5. Nitrate reduction=negative in 5 days (both aerobically and anaerobically)
6. Anaerobic organism.
7. Lead acetate agar=vigorous gassing in 24 hours; no blackening in 5 days.
8. Gas formed=$CO_2$ and $H_2$.
9. Fermentation tests:

a. *Fermented with avidity:*—Gas formation— arabinose, dextrine, galatose, lactose, levulose, maltose, mannose, sucrose, xylose, glucose.
    b. *Fermented after extended period:*—Gas formation—glycogen, mannitol, salacin, inositol, inulin, sorbitol, melezitose, a-methyl-glucoside.
    c. *Fermented poorly:*—Soluble starch (started gassing or fermenting after 37 days incubation), starch bearing materials such as corn, rye, wheat, rice, barley.
    d. *Did not ferment in 85 days:*—Cellulose quercitol, adonitol, glycerol, erythritol, rhamnose, calcium lactate.

The gelatine liquefaction test mas made on a 10.8% "Bacto-nutrient gelatine" solution containing 0.25 grams of glucose per 100 cc. of the solution. "Bacto-nutrient gelatine" is a nutrient material comprising three parts beef extract, five parts peptone and one hundred parts gelatine, as recommended by the Committee on Standard Methods of the Society of American Bacteriologists. The tests were made with active twenty hour cultures. The tubes gassed well but no liquefaction was observed even after 40 days incubation at about 35° C.

The bacillus will not ferment starch bearing materials, such as corn, rye and wheat, and therefore such materials cannot be economically utilized unless the starch is converted by other means into fermentable materials, such as maltose, dextrose, an dextrine. The latter are readily fermented. This may be explained on the hypothesis that the organism does not secrete the necessary enzymic material which will cause the starch in such materials to be readily converted into materials that can be fermented by the organism. For example, a 3 liter mash of 5% corn meal was heated for about two hours under a steam pressure of 17 pounds, inoculated and held at about 36° C. for 4 days. The solvents produced, if any, were in such a minute amount that identification of their nature could not be made. The isolated bacillus vigorously fermented boiled molasses mashes, giving high yields of butyl alcohol and acetone and efficient utilization of the sugars present. At the time of inoculation, the mashes were substantially free of dissolved oxygen.

The spores of this organism are very heat resisting. In a medium with pH of 4.3–4.5 the spores will withstand heating for fifteen minutes at about 85° C.

As typical of the sub-culturing procedure which may be employed in preparing the inoculant the following procedure may be mentioned but it is to be understood that other procedures can be used.

About 0.5 cc. of a pure culture containing free spores was transferred to a glass culture tube about six inches long by one-half inch outside diameter and about one-sixteenth inch thick walls. The tube contained about 10 cc. of sterile potato mash composed of 7% to 10% potato and 1% to 4% corn sugar in water. The inoculated tube was heated by inserting the tube into a beaker of water so that the level of the medium in the tube was well below the level of the water in the beaker. The water in the beaker was maintained at a temperature of about 85° C. and the tube remained in the beaker 15 minutes and then it was removed and immediately cooled by plunging the tube into cold water. The tube was incubated at about 35° to 37° C. for 15 to 24 hours within which time a vigorous fermentation started.

This 10 cc. of subculture was then used as the inoculum for a flask containing about 200 to 500 cc. of similar sterile potato mash. After inoculation, this was incubated at about 35° to 37° C. for about 6 to 20 hours. In this manner, a suitable volume of inoculant for the volume of mash to be fermented is prepared. An inoculant of about 2% to 5% of the volume of the mash gives good results but relatively larger or smaller volumes of inoculant can be used.

The following typical fermenting procedures are mentioned as illustrative of the invention but it is to be understood that other conditions, other volumes of inoculant and other sugary materials may be used.

*Example 1*

150 liters tap water.
10000 g. blackstrap cane molasses.
400 g. corn gluten meal.
40 g. ammonium sulphate.
45 cc. N/1 lactic acid.
Sterilized by boiling 60 minutes.
Inoculated with 2⅓% active culture.
Hours fermenting=60.
Yield=approx. 24% of original sugar by weight.
Yield=approx. 64.1% N-butyl alcohol.
Yield=approx. 35.9% acetone.
Yield=approx. 0 ethyl alcohol.
Sugar consumed=approx. 65%.
Highest acid point during fermentation=2.2.

*Example 2*

150 liters tap water.
7800 g. blackstrap cane molasses.
1950 g. beet molasses.
45 g. glue.
25 g. beet pulp.
50 g. ammonium sulphate.
Sterilized by boiling 60 minutes.
Inoculated with 2⅓% by volume active culture.
Hours fermenting=72.
Yield=approx. 26% of original sugar by weight.
Yield=approx. 64.5% N-butyl alcohol.
Yield=approx. 35.5% acetone.
Yield=approx. 0 ethyl alcohol.
Sugar consumed=approx. 75%.
Highest acid point during fermentation=2.1.

*Example 3*

150 liters tap water.
4500 g. beet molasses.
4500 g. corn (dextrose) syrup commercially known as "Hydrol".
400 g. corn gluten meal.
25 cc. conc. $H_2SO_4$.
Sterilized by boiling 50 minutes.
Inoculated with 5½% by volume active culture.
Hours fermenting=79 hours.
Yield=approx. 28% of total fermentable carbohydrate material.
Yield=approx. 77% N-butyl alcohol.
Yield=approx. 23% acetone.
Yield=approx. 0 ethyl alcohol.
Sugar consumed=approx. 83%.
Highest acid point during period of fermentation=1.7.

*Example 4*

150 liters tap water.
9000 g. beet molasses.
25 cc. conc. $H_2SO_4$.
100 g. corn gluten meal.
Sterilized by boiling 60 minutes.
Inoculated with 2% by volume active culture.
Hours fermenting=90 hours.
Yield=approx. 20% of original sugar by weight.
Yield=approx. 77% N-butyl alcohol.
Yield=approx. 23% acetone.
Yield=approx. 0 ethyl alcohol.
Sugar consumed=approx. 60%.
Highest acid point during fermentation=1.0.

It is not always necessary to add protein-containing nutrients. Beet molasses and some cane molasses contain sufficient assimilable proteins. Where the mash is deficient in assimilable protein matter, a mixture of high and low protein sugary materials can be used or a nonsugary protein material may be added. An ample supply of assimilable nitrogenous material is desirable.

In the above described fermentations the mashes were fermented at 36° C. The optimum temperature for fermentation is about 36° C., that is 30° to 40° C.

After the mash is sterilized or prepared for inoculation it is not absolutely necessary to prevent air from coming in contact with the mash but it is best that the mash be substantially free of dissolved oxygen.

In carrying out this bacterial fermentation process and to insure the best results, it is obvious to those skilled in the art that extreme care must be exercised in order to avoid the possibility of contaminating the medium after sterilization has been accomplished and particularly during the moment of inoculating.

The titratable acidity of the mash is considerably lower throughout the fermentation than with other butyl alcohol-acetone producing organisms of which I am aware, such as Bacillus granulobacter pectinovorum, Bacillus acetobutylicum and Clostridium aceto-butylicum. For example the titratable acidity of a mash containing about 3% to 3.5% sugars may commonly increase in the first 15 to 24 hour period from values corresponding to about 0.5 to 0.6 cc. of tenth normal alkali per 10 cc. of the mash to about 2.2 cc. of tenth normal alkali per 10 cc. of the mash. The acidity may diminish during the next 12 to 24 hours to values corresponding to about 1.2 to 1.8 cc. of tenth normal alkali per 10 c.c. of mash. The fermentation is normally completed in about 2 to 3½ days from the time the inoculant is added. The organism does not give good yields of solvents when the titratable acidity of the mashes during fermentation rises above approximately 2.7.

In all titrations for acidity or alkalinity, litmus paper was used as the indicator.

One of the main functions of the organic nutrient, being to supply proteins for the growth of the bacteria, various organic nutrients of vegetable or animal origin, such as potato, corn gluten, rye, barley, wheat, rice, beet pulp, soy bean meal, cotton seed meal, copra meal, linseed meal, malt sprouts, slaughter house tankage, casein, glue, sewerage sludge, bone meal, ethyl alcohol slop and other protein-containing materials, can be used.

Substances containing inorganic nitrogen, that is substances containing an inorganic nitrogen radical, such as the sulphate, carbonate, bicarbonate, chloride, phosphates acetate, butyrate, hydroxide and lactate of ammonium have a marked effect on the fermentation in that the fermentation is completed in less time, in that the consumption of carbohydrate material is increased, and in that the split-up of solvents or ratio of butyl alcohol to acetone in the produced solvent is changed. More acetone and less butyl alcohol are produced when inorganic nitrogen-containing substances are present. Small amounts of water-soluble inorganic nitrogen-containing substances are used, say about 0.0002% to 0.1% by weight, of the mash or even more. The term "small amount" as used in the specification and claims in connection with water-soluble inorganic nitrogen-containing substances, refers to quantities of this magnitude. For example, mashes containing no added inorganic nitrogen have produced mixed solvents containing as high as 75% to 85% butyl alcohol. A similar mash which contained water-soluble inorganic nitrogen was fermented under similar conditions. The solvents produced by the latter fermentation contained about 65% to 73% butyl alcohol and a correspondingly greater amount of acetone. The time required to complete the fermentation may be shortened in this manner from about 6 to 24 hours.

A desirable acidity for the mash before inoculation is a slight acidity to litmus, i. e., from about 0.2 cc. to 2.5 cc. titratable acid per 10 cc. of mash. This corresponds to a hydrogen ion concentration of about pH 4.2 to 6.7 but with some types of sugars the pH value of the mash may be 7.5 or even higher. Mashes with more or less acidity may preferably, though not necessarily, be adjusted by adding an acid, such as sulphuric, hydrochloric, lactic, butyric or phosphoric; or by adding a base, such as a hydroxide or carbonate of ammonium, or of an alkali or an alkaline earth metal. In the best typical yields with lower sugar concentrations, the titratable acidity does not exceed an equivalent of about 2.7 cc. of tenth normal sodium hydroxide per 10 cc. of mash during the fermentation. The titratable acidity in such mashes of blackstrap cane molasses rarely exceeds 2.5 cc. of tenth normal acid per 10 cc. of mash. In other mashes, such as beet molasses and dextrose syrup, the maximum acidity may be much lower.

I have obtained excellent yields of butyl alcohol and rapid fermentations on mashes having pH values of at least 4.0 and less than 5.0. As far as I am aware, no known butyl alcohol-producing organism is capable of giving good yields when the pH value of the mash at the time of combining the culture and the mash is less than 5.0. For example, a molasses mash of about 3½% sugar concentration, with a pH value of about 4.2, was inoculated with about 2⅓% by volume of active culture. It gave a total yield of solvents in excess of 25% by weight of sugar mashed within a period of 60 hours.

The mash may be sterilized by boiling, cooled and fermented in metal tanks, such as steel. Pressure sterilization is unnecessary although pressure sterilization as well as temperatures below 100° C. may be used. It is usually sufficient to boil the mash about 30 to 60 minutes. Excellent results have been obtained in steel tanks by boiling the mash for 30 to 60 minutes and fermenting in the same container.

I have found that when no solid matter is present in the mash, a small amount of solid water insoluble material, inert with respect to said mash, may be added before sterilization. The presence of such solid matter aids somewhat in obtaining a rapid and complete fermentation. Such materials as finely pulverized carbon, sawdust, straw, starch, cellulose, beet pulp, etc., may be used.

The approximate split-up of solvents may vary as follows:

| | By weight |
|---|---|
| Normal butyl alcohol | 65% to 85% |
| Acetone | 15% to 35% |

While there are some variations in the split-up when different kinds of fermentable materials are used, about 1 part of lower boiling solvents and about 2 to 6 parts butyl alcohol, or even more, may be mentioned as the typical split-up in molasses mashes in which no materials other than water, carbohydrate material and organic protein material have been added. My organism produces a different split-up of end-products than any other butyl alcohol-acetone producing organism of which I am aware, in that a relatively greater proportion of butyl alcohol is produced, together with a comparatively high yield of acetone.

The split-up of gaseous products is about 60% to 65% carbon dioxide and about 35% to 40% hydrogen by volume.

The sugary material can be economically utilized and good yields of solvents can be produced in mashes which have a concentration of sugary material of about 2% to 5% or even more of the weight of the mash. About 75% to 85% or more of the sugary material in the mash can be consistently consumed when the concentration is not above about 5%. Higher concentrations of sugary material can be used but comparatively less of the total fermentable material is, in general, converted into butyl alcohol and acetone, for example sugar consumptions as high as 80% in mashes containing 6% sugar are typical.

Ethyl alcohol is rarely produced by my organism. In the few instances where ethyl alcohol has been found, it has been produced only in traces or in amounts up to about 2%. In fermenting cane molasses, no ethyl alcohol is commonly produced but certain grades of cane molasses appear sometimes to give these small amounts of ethyl alcohol. My experience in fermenting hundreds of cane molasses mashes has shown that the organism does not normally produce ethyl alcohol.

The term, mash in the specification and claims refers to solutions containing carbohydrate material as well as to mixtures which contain solids and water.

The term, sugary in the specification and claims refers to sugars, such as sucrose, dextrose, levulose and maltose and to hydrolyzed carbohydrate materials which resemble and may be considered as sugars, such as dextrine, inulin and the syrups occurring as residues in the manufacture of corn sugar which syrups contain principally dextrose and/or dextrine.

Although the invention has been explained with reference to various specific examples, it is to be understood that it is not specifically limited thereto. For example, organic nutrients and substances containing inorganic nitrogen can be added to or excluded from any of the described mashes; mashes containing other sugary substances can be fermented; variations in the described optimum conditions can be made as these conditions are affected by changes in the concentrations and kinds of raw materials used to make the mashes, and the concentration of the sugary substance in the mash can be varied within broad limits.

The invention is hereby claimed as follows:

1. The method of manufacturing butyl alcohol and acetone which comprises inoculating a mash comprising essentially a water solution of a fermentable non-starch carbohydrate, with a culture of Clostridium Saccharobutyl-acetonicum, and allowing the mash to ferment by the action of said clostridium.

2. The method of manufacturing butyl alcohol and acetone by fermentation of a fermentable sugary mash which comprises inoculating said mash with a culture of Clostridium Saccharobutyl-acetonicum, and allowing the mash to ferment by the action of said clostridium 3. The method of manufacturing butyl alcohol and acetone which comprises bringing fermentable sugary material into solution with water to provide a mash, adjusting the pH value of the mash between about 4.0 and about 7.5, inoculating the mash with Clostridium Saccharobutyl-acetonicum, and allowing the mash to ferment by the action of said clostridium.

4. The method of manufacturing butyl alcohol and acetone which comprises preparing a molasses mash, adjusting the pH value of the mash between about 4.0 and about 7.5, inoculating the mash with Clostridium Saccharobutyl-acetonicum, and allowing the mash to ferment by the action of said clostridium.

5. The method of manufacturing butyl alcohol and acetone which comprises preparing a fermentable mash containing water and fermentable sugary material, partially neutralizing the mash to provide a pH value between 4.0 and 7.5, inoculating the mash with Clostridium Saccharobutyl-acetonicum, and fermenting the mash by the action of said clostridium.

6. The method of manufacturing butyl alcohol and acetone by fermentation of a fermentable sugary mash which comprises making a mash comprising essentially a solution of molasses in water, inoculating said mash with a culture of Clostridium Saccharobutyl-acetonicum, and allowing the mash to ferment by the action of said clostridium.

7. In the manufacture of butyl alcohol and acetone, the step which comprises mixing a fermentable mash of sugary material with a culture of Clostridium Saccharobutyl-acetonicum capable of fermenting the same.

8. In the manufacture of butyl alcohol and acetone, the step which comprises mixing a mash of fermentable non-starch carbohydrate material with a culture of Clostridium Saccharobutyl-acetonicum capable of fermenting the same.

9. The method of manufacturing butyl alcohol and acetone which comprises preparing a mash of fermentable sugary material, sterilizing the mash, inoculating the mash at about 36° C. with a culture of Clostridium Saccharobutyl-acetonicum while the mash is relatively free of dissolved oxygen, and fermenting at about 36° C. by the action of said clostridium.

10. The method of manufacturing solvent containing butyl alcohol which comprises bringing fermentable sugary material into solution with water to provide a mash, adjusting the pH value of the mash between a value of about 4.0 and a value less than 5.0, inoculating with a culture of Clostridium Saccharobutyl-acetonicum, and allowing the mash to ferment by the action of said clostridium 11. The method of bacterial fermentation which comprises making a mash which comprises essentially a water solution of a fermentable non-starch carbohydrate, adjusting the hydrogen-ion concentration of the mash to a pH of at least 4 and less than 5, inoculating with a culture of Clostridium Saccharobutyl-acetonicum, and allowing the mash to ferment by the action of said clostridium.

12. The method of manufacturing butyl alcohol and acetone which comprises bringing fermentable sugary material into solution with water to provide a mash, bringing the pH value of the mash to about 4.2 by adding a neutralizing substance, inoculating the mash with Clostridium Saccharobutyl-acetonicum, and allowing the mash to ferment by the action of said clostridium.

13. The method of manufacturing butyl alcohol and acetone which comprises bringing fermentable sugary material into solution with water, adding nitrogenous nutrient material, inoculating with Clostridium Saccharobutyl-acetonicum, and allowing the mash to ferment by the action of said clostridium.

14. The method of manufacturing butyl alcohol and acetone which comprises bringing fermentable sugary material, organic protein material and a water-soluble inorganic nitrogen-containing material in admixture with water to provide a mash, inoculating the mash with Clostridium Saccharobutyl-acetonicum, and allowing the mash to ferment by the action of said clostridium.

15. The method of manufacturing butyl alcohol and acetone by fermentation of a sugary mash which comprises making a mash comprising essentially a solution of fermentable sugary material in water, adjusting the pH value of the mash between about 4.0 and about 7.5 and the acidity between about 0.2 cc. to about 2.5 cc. of tenth normal titratable acid per 10 cc. of mash, inoculating with a culture of Clostridium Saccharobutyl-acetonicum, and allowing the mash to ferment by the action of said clostridium.

16. The method of accelerating the fermentation and increasing the relative amount of acetone produced in the fermentation of sugary mashes which are inoculated with Clostridium Saccharobutyl-acetonicum and are fermented by the action of said clostridium which comprises adding a small amount of water-soluble inorganic nitrogen-containing material to the mash.

17. The method of accelerating the fermentation and increasing the relative amount of acetone produced in the fermentation of sugary mashes which are inoculated with Clostridium Saccharobutyl-acetonicum and are fermented by the action of said clostridium which comprises adding a small amount of water-soluble inorganic ammonium compound to the mash.

18. In the bacterial fermentation of a fermentable sugary mash by the action of Clostridium Saccharobutyl-acetonicum, the method of accelerating the fermentation which comprises adding to the mash about 0.0002% to about 0.1% by weight of the mash of a water-soluble ammonium compound, and bringing the hydrogen-ion concentration of the mash prior to inoculation to a pH value between 4 and 5.

19. The method of fermenting a mash containing fermentable sugary material which comprises adding to the mash a small amount of water-soluble ammonium compound, bringing the hydrogen-ion concentration of the mash to a pH value of at least 4 and less than 5, inoculating with a culture of Clostridium Saccharobutyl-acetonicum, and allowing the mash to ferment by the action of said clostridium.

20. The method of accelerating the fermentation and increasing the relative amount of acetone produced in the fermentation of fermentable sugary mashes that are inoculated with a culture of Clostridium Saccharobutyl-acetonicum and are fermented by the action of said clostridium, which comprises carrying out the fermentation in the presence of a water-soluble ammonium compound which is added to the mash in the proportion of about 0.0002% to about 0.1% of the weight of the mash.

21. In the manufacture of butyl alcohol and acetone by the fermentation of fermentable sugary mashes by the action of Clostridium Saccharobutyl-acetonicum, the step which comprises adding to the mash a small amount of an ammonium salt which accelerates the fermentation and increases the relative amount of acetone produced in the fermentation.

22. The method of accelerating the fermentation and increasing the relative amount of acetone produced in the fermentation of fermentable sugary mashes which are inoculated with a culture of Clostridium Saccharobutyl-acetonicum and are fermented by the action of said clostridium, which comprises adding a small amount of an ammonium salt to the mash.

23. The method of manufacturing butyl alcohol and acetone which comprises making a mash comprising essentially fermentable sugary material and water, adding subdivided solid material which is insoluble in the mash, adding a culture of Clostridium Saccharobutyl-acetonicum, and fermenting the mash by the action of said clostridium.

24. An inoculum comprising essentially a culture of Clostridium Saccharobutyl-acetonicum, and a medium which contains fermentable sugary material.

25. An inoculum comprising essentially a culture of sporulated Clostridium Saccharobutyl-acetonicum and a medium which contains fermentable sugary material.

26. An inoculum consisting of an active culture of Clostridium Saccharobutyl-acetonicum and a medium containing fermentable sugary material.

27. An inoculum comprising essentially Clostridium Saccharobutyl-acetonicum and a medium which contains molasses.

JAMES F. LOUGHLIN.

CERTIFICATE OF CORRECTION.

Patent No. 1,992,921.　　　　　　　　　　　　　　　　　February 26, 1935.

JAMES F. LOUGHLIN.

It is hereby certified that error appears in the printed specification of the above numbered patent requiring correction as follows: Page 3, second column, line 39, for "the" read these; and that the said Letters Patent should be read with this correction therein that the same may conform to the record of the case in the Patent Office.

Signed and sealed this 2nd day of July, A. D. 1935.

(Seal)

Leslie Frazer
Acting Commissioner of Patents.